(12) United States Patent
Bae et al.

(10) Patent No.: US 10,099,171 B2
(45) Date of Patent: *Oct. 16, 2018

(54) GAS CAPTURE PLANT

(71) Applicants: Hyundai Motor Company, Seoul (KR); Korea Institute of Energy Research, Daejeon (KR)

(72) Inventors: Shin-Tae Bae, Gyeonggi-do (KR); Sungchan Nam, Daejeon (KR); Sungyeoul Park, Daejeon (KR); Yeoil Yoon, Daejeon (KR)

(73) Assignees: Hyundai Motor Company, Seoul (KR); Korea Institute of Energy Research, Daejeon (KR)

( * ) Notice: Subject to any disclaimer, the term of this patent is extended or adjusted under 35 U.S.C. 154(b) by 363 days.

This patent is subject to a terminal disclaimer.

(21) Appl. No.: 14/956,676

(22) Filed: Dec. 2, 2015

(65) Prior Publication Data

US 2016/0236138 A1 Aug. 18, 2016

(30) Foreign Application Priority Data

Feb. 16, 2015 (KR) ........................ 10-2015-0023460

(51) Int. Cl.
 *B01D 53/14* (2006.01)
 *B01D 53/18* (2006.01)
 (Continued)

(52) U.S. Cl.
 CPC ....... *B01D 53/1425* (2013.01); *B01D 5/0012* (2013.01); *B01D 5/0057* (2013.01);
 (Continued)

(58) Field of Classification Search
 CPC ............ B01D 19/0015; B01D 53/1425; B01D 53/1475; B01D 53/18; B01D 5/0012; B01D 5/0057; B01D 5/0069; Y02C 10/06
 See application file for complete search history.

(56) References Cited

U.S. PATENT DOCUMENTS 2,914,469 A * 11/1959 Draemel ............ B01D 53/1425
 203/37
4,276,125 A * 6/1981 Issei ......................... B01D 5/00
 203/4

(Continued)

FOREIGN PATENT DOCUMENTS

JP H10249139 A 9/1998
JP 4431812 B2 3/2010

(Continued)

*Primary Examiner* — Cabrena Holecek
(74) *Attorney, Agent, or Firm* — Mintz Levin Cohn Ferris Glovsky and Popeo, P.C.; Peter F. Corless (57) ABSTRACT

A gas capture plant is provided. The gas capture plant includes an absorption tower for dissolving an object gas that requires regeneration in a lean absorbent liquid to produce rich absorbent liquid. A regeneration tower heats the rich absorbent liquid produced in the absorption tower to produce the lean absorbent liquid from which the regeneration gas is separated and the produced lean absorbent liquid is supplied back to the absorption tower. A gas condensing device condenses the regeneration gas received from the regeneration tower to separate condensate and target gas, thereafter, supplying the separated condensate to the regeneration tower, and exhausting the separated target gas. The gas condensing device includes a condenser and a reflux apparatus disposed within one housing and the condenser is disposed above the reflux apparatus.

18 Claims, 5 Drawing Sheets

(51) Int. Cl.
 B01D 5/00 (2006.01)
 B01D 19/00 (2006.01)
(52) U.S. Cl.
 CPC ....... B01D 5/0069 (2013.01); B01D 19/0015 (2013.01); B01D 53/1475 (2013.01); B01D 53/18 (2013.01); Y02C 10/06 (2013.01)

(56) References Cited

U.S. PATENT DOCUMENTS

| | | | |
|---|---|---|---|
| 9,410,750 B1* | 8/2016 | Kurukchi | ................ F28F 25/10 |
| 2010/0322842 A1 | 12/2010 | Iijima et al. | |
| 2015/0196857 A1* | 7/2015 | Park | ................ B01D 19/0073 |
| | | | 96/181 |

FOREIGN PATENT DOCUMENTS

| | | |
|---|---|---|
| JP | 2013-180281 A | 9/2013 |
| KR | 10-2010-0113438 A | 10/2010 |
| KR | 10-0993689 B1 | 11/2010 |
| KR | 10-2013-0010253 A | 1/2013 |

* cited by examiner

GAS CAPTURE PLANT

CROSS-REFERENCE TO RELATED APPLICATION

This application claims priority to and the benefit of Korean Patent Application No. 10-2015-0023460 filed in the Korean Intellectual Property Office on Feb. 16, 2015, the entire contents of which are incorporated herein by reference.

BACKGROUND (a) Field of the Invention

The present invention relates to a gas capture plant that is applicable to a gas-liquid separating process and more particularly, to a gas capture plant that produces rich absorbent liquid by dissolving the object gas in an absorbent liquid, regenerating the produced rich absorbent liquid to generate regeneration gas, and then separating the target gas from the regeneration gas by condensing the regeneration gas.

(b) Description of the Related Art

Recently, techniques for suppressing the release of carbon dioxide into the atmosphere have been researched and developed as global warming and air pollution become increasingly severe. For example, an increased focus has been placed on developing a method of efficiently trapping carbon dioxide emitted from thermoelectric power plants or boiler equipment. Among the various methods of trapping gas, the chemical absorption method using an absorbent liquid is particularly suitable for trapping a substantial capacity of carbon dioxide. A gas capture plant using the chemical absorption method, absorbs the carbon dioxide emitted from thermoelectric power plants or boiler equipment into an absorbent liquid within an absorption tower. Thereafter, the regeneration tower heats the saturated absorbent liquid containing carbon dioxide separating the regeneration gas containing the carbon dioxide from the absorbent liquid.

Typically, a conventional gas capture plant mixes the carbon dioxide and the absorbent liquid at a rectifier mounted in the absorption tower. An apparatus for capturing the absorbent liquid at a center portion of the rectifier is mounted in a filler or a separating plate to evenly separate the gas. Furthermore, the filler is mounted in an upper portion of the absorption tower preventing channeling from occurring when the absorbent liquid passes through the filler in the rectifier. In other words, changing a structure of the upper portion of the absorption tower prevents channeling of the gas and the liquid. However, controlling the abnormal phenomena due to the rapid linear velocity of gas at the lower portion of the absorption tower and an absorbent liquid drop has proven to be difficult.

Additionally, a reboiler for heating the absorbent liquid and serving as an energy source for regeneration is mounted to the regeneration tower. The reboiler heats the absorbent liquid to a suitable temperature for regeneration to separate the gas contained in the absorbent liquid. The gas separated from the absorbent liquid flows to an upper portion of the regeneration tower to capture the useful material into a condenser and to discharge the gas from the regeneration tower. Conventionally, a kettle type or a thermocyphon type reboiler have been used. The kettle type reboiler includes first and second parts disposed therein and divided by a wall. A heater or a heat-exchanger is disposed in the first part and an absorbent liquid outlet is formed at the second part. When the absorbent liquid containing the gas is supplied to an upper portion of the reboiler, a level of the absorbent liquid in the reboiler increases. Then, the heater or the heat-exchanger increases the temperature of the absorbent liquid and the gas is separated from the absorbent liquid and dissipates. As the absorbent liquid is continuously supplied, the gas is removed or reduced and is thereby transported via the wall into the second part. Thereafter, the absorbent liquid is discharged from the reboiler through the absorbent liquid outlet. Often a fluid oscillation (e.g., wave, liquid movement or fluid disturbance) occurs within the reboiler of the kettle type, due to the movement generated by the liquid drop and the boiling of the mixed liquid. Therefore, it may be difficult to precisely control the level of the absorbent liquid.

The reboiler of the thermocyphon type includes a heater or a heat-exchanger disposed therein and an absorbent liquid outlet formed at a bottom surface of the reboiler. When the absorbent liquid containing the gas is supplied to an upper portion of the reboiler, the absorbent liquid in the reboiler is heated by the heater or the heat-exchanger. The gas is separated from the absorbent liquid and dissipates in an upward direction. The absorbent liquid from which the gas is removed or flows in the direction of the bottom surface of the reboiler and is discharged from the reboiler through the absorbent liquid outlet. The level of the absorbent liquid may be difficult to control in the reboiler of the thermocyphon type, due to boiling. Additionally, since the boiler is constructed without a wall, the mixed liquid remains in the reboiler for a minimal short duration of time. Therefore, a reduced amount of energy is supplied to the mixed liquid which reduces the efficiency of the gas separation for regeneration.

The kettle type and the thermocyphon type reboilers have a similar supply path of the mixed liquids and a discharge path of the gases separated from the mixed liquids. Therefore, when bubbles are generated due to heating, the mixed liquid cannot reach the heater or the heat-exchanger since the path is obstructed by the bubbles. When this condition continues, the level of the mixed liquid in the regeneration tower is elevated thereby impeding the intended function of the absorption tower and the regeneration tower.

Furthermore, a gas capture plant using the chemical absorption method includes a condenser configured to condense the regeneration gas and generate condensate, and a reflux apparatus configured to discharge the gas evaporated from the condensate to an exterior thereof to capture the gas and supply the condensate back into the regeneration tower. Typically, within a conventional gas capture plant, the condenser and the reflux apparatus are separately disposed to adjust the level of the condensate within the reflux apparatus. As a result, the volume of the gas capture plant increases and a larger space is required to mount the gas capture plant. Additionally, a substantial amount of heat loss occurs between the reflux apparatus and the condenser since the reflux apparatus and the condenser are separate.

The above information disclosed in this section is merely for enhancement of understanding of the background of the invention and therefore it may contain information that does not form the prior art that is already known in this country to a person of ordinary skill in the art.

SUMMARY

The present invention provides a gas capture plant for improving gas capturing efficiency by separating a path of gas from a path of liquid at a lower portion of an absorption tower and a lower portion of a regeneration tower. Another aspect provides a gas capture plant that may reduce the mounting space and the heat loss by configuring a condenser and a reflux apparatus to be mounted in a single housing.

In one aspect, a gas capture plant may include an absorption tower configured to dissolve the object gas that requires regeneration (i.e., including a material that will be separated) within the lean absorbent liquid to produce rich absorbent liquid and a regeneration tower for heating the rich absorbent liquid produced in the absorption tower to produce the lean absorbent liquid. The regeneration gas may be separated and the produced lean absorbent liquid may be returned back to the absorption tower. A gas condensing device may be configured to condense the regeneration gas received from the regeneration tower to separate the condensate and the target gas, and may be configured to supply the separated condensate to the regeneration tower. The separated target gas may be exhausted, wherein the gas condensing device may include a condenser and a reflux apparatus disposed within a single housing, and the condenser may be disposed above the reflux apparatus.

The absorption tower may include an absorption tower housing, a lean absorbent liquid supplier that may be positioned at an upper portion in the absorption tower housing and may be configured to supply the lean absorbent liquid into the absorption tower housing. An absorption tower rectifier may be positioned below the lean absorbent liquid supplier in the absorption tower housing and may be configured to rectify the flow of the lean absorbent liquid supplied toward a lower portion of the absorption tower housing. An absorption liquid chamber may be positioned under the absorption tower rectifier in the absorption tower housing and may be configured to temporarily store the rich absorbent liquid in which object gas is dissolved. An absorption separator may be disposed between the absorption tower rectifier and the absorption liquid chamber within the absorption tower housing, wherein the object gas may be supplied into the absorption liquid chamber.

In another aspect the absorption separator may be configured to separate an outlet through which the object gas flows out of the absorption liquid chamber from an inlet through which the rich absorbent liquid enters the absorption liquid chamber. The absorption separator may include a first mounting plate that may be disposed traversely across the absorption tower housing between the absorption tower rectifier and the absorption liquid chamber and may provide at least one first gas flow aperture formed thereon. The absorption separator may further include a first body of hollow pillar shape mounted on an upper surface of the first mounting plate and may have an upper surface obstructed by a first roof and at least one first gas bypass port formed at a side surface of the first body. An interior of the first body may be in fluid communication with an exterior of the first body. A first liquid supplying pipe may extend downward from the first mounting plate and may be configured to supply absorbent liquid into the absorption liquid chamber. The at least one first gas flow aperture may be in fluid communication with an interior of the absorption tower housing positioned under the first mounting plate within the interior of the first body. A treated gas outlet for discharging the treated gas from which target gas may be removed to an exterior of the absorption tower housing may be formed at an upper end portion of the absorption tower housing. Further, an absorption tower outlet for supplying the rich absorbent liquid to a regeneration tower may be formed at a lower end portion of the absorption tower housing.

The regeneration tower may include a regeneration tower housing, a rich absorbent liquid supplier disposed above the regeneration tower housing and configured to supply the rich absorbent liquid into the regeneration tower housing. The regeneration tower may further include a regeneration tower rectifier disposed below the rich absorbent liquid supplier in the regeneration tower housing and may be configured to supply the rectified the rich absorbent liquid downward in the regeneration tower housing. A reboiler may be disposed in the regeneration tower housing below the regeneration tower rectifier and may be configured to boil the rich absorbent liquid to separate the regeneration gas from the rich absorbent liquid. Additionally, a rich absorbent liquid tank may be configured to temporarily store the rich absorbent liquid. A regeneration separator may be configured to supply the rich absorbent liquid from the regeneration tower rectifier into the rich absorbent liquid tank. Further the regeneration separator may be disposed within the regeneration tower housing between the reboiler and the regeneration tower rectifier and may be configured to exhaust the regeneration gas generated in the reboiler to the exterior of the reboiler. A lean absorbent liquid tank may be configured to receive the lean absorbent liquid from which the regeneration gas is separated at the reboiler and may be configured to temporarily store the lean absorbent liquid. The reboiler may be configured to receive the rich absorbent liquid via the rich absorbent liquid tank. A rich absorbent liquid outlet may be formed at a lower portion of the rich absorbent liquid tank, and a rich absorbent liquid inlet which may be in fluid communication with the rich absorbent liquid outlet that may be formed at a lower portion of the regeneration tower housing. For example, the rich absorbent liquid in the rich absorbent liquid tank may be supplied to the reboiler through the rich absorbent liquid outlet and the rich absorbent liquid inlet.

The regeneration tower housing may be in fluid communication with the rich absorbent liquid tank through a rich absorbent liquid connection line and may be in fluid communication with the lean absorbent liquid tank through a lean absorbent liquid connection line. A connection portion of the rich absorbent liquid connection line and the regeneration tower housing may be disposed higher than the lean absorbent liquid connection line and the regeneration tower housing. The regeneration separator may be configured to supply the rich absorbent liquid through the regeneration tower rectifier into the reboiler through the rich absorbent liquid tank to directly exhaust the regeneration gas generated in the reboiler to the exterior of the reboiler.

In particular, the regeneration separator may include a second mounting plate that may be disposed traversely across the regeneration tower housing below the connection portion of the rich absorbent liquid connection line and the regeneration tower housing. The regeneration separator may provide at least one second gas flow aperture formed thereon. A second body having a hollow pillar shape may be mounted on an upper surface of the second mounting plate and may have an upper surface blocked by a second roof. At least one second gas bypass port may be formed at a side surface of the second body and an interior of the second body may be in fluid communication with an exterior of the second body, wherein the at least one second gas flow aperture may be in fluid communication with an interior of the regeneration tower housing disposed beneath the second mounting plate within the interior of the second body.

The regeneration gas generated within the reboiler may be supplied to the interior of the regeneration tower housing positioned above the second mounting plate through the at least one second gas flow aperture and the at least one second gas bypass port. The connection portion of the lean absorbent liquid connection line and the regeneration tower housing may be positioned between the reboiler and the second mounting plate.

In another aspect, the reboiler may include a first circulation line through which operating fluid may flow and a second circulation line through which the lean absorbent liquid, the rich absorbent liquid and/or the regeneration gas may flow. Further, the first circulation line and the second circulation line may be formed proximate to each other, and the operating fluid flowing through the first circulation line may be isolated (e.g., not mixed) and may be heat-exchanged with the lean absorbent liquid, the rich absorbent liquid and/or the regeneration gas flowing through the second circulation line. The reboiler may include an electric wire configured to receive current and generate heat. A lean absorbent liquid outlet configured to supply the lean absorbent liquid back into the absorption tower may be formed at a lower portion of the lean absorbent liquid tank, and a regeneration gas outlet configured to supply the regeneration gas into the gas condensing device may be formed at an upper portion of the regeneration tower housing.

In another aspect, the reflux apparatus may include a condensate chamber formed at a lower portion of the one housing may be configured to temporarily store the condensate. A reflux separator may be disposed within the one housing between the condenser and the condensate chamber. The reflux apparatus may be configured to supply the condensate passing through the condenser into the condensate chamber, and exhaust the evaporation gas that is evaporated from the condensate to the exterior of the condensate chamber.

The reflux separator may be configured to separate an outlet that exhausts the evaporation from the condensate chamber from an inlet that passes the condensate through the condenser into the condensate chamber. The reflux separator may include a third mounting plate disposed traversely across the one housing between the condenser and the condensate chamber and provided with at least one third gas flow aperture formed thereon. Further, a third body of the hollow pillar shape may be mounted on an upper surface of the third mounting plate and may have an upper surface blocked by a third roof. At least one third gas bypass port may be formed at a side surface of the third body and an interior of the third body may be in fluid communication with an exterior of the third body. A second liquid supplying pipe may extend downward from the third mounting plate and may be configured to supply the condensate into the condensate chamber, wherein at least one third gas flow aperture may be in fluid communication with an interior of the one housing beneath the third mounting plate with the interior of the third body.

A target gas outlet configured to exhaust the target gas separated from the regeneration gas to the exterior of the gas condensing device may be formed at the one housing positioned above the third mounting plate. A condensate outlet configured to supply the condensate back into the regeneration tower may be formed at a lower portion of the one housing, and a regeneration gas inlet configured to receive the regeneration gas from the regeneration tower may be formed at an upper portion of the one housing.

According to another aspect, the heat loss may be prevented and a mounting space may be reduced by mounting a condenser and a reflux apparatus within one housing. Furthermore, a path through which condensate flows into a reflux apparatus may be separated from a path through which evaporation gas may be exhausted from the reflux apparatus in a reflux separator to mount a condenser and the reflux apparatus within one housing. Therefore, controlling a level of the condensate may be possible.

In another aspect, a path through which mixed liquid is supplied into a reboiler may be separated from a path through which gas is exhausted from the reboiler in a regeneration tower and thus, the gas may be more stably separated from absorbent liquid containing the gas. Therefore, gas separating process may be more stably performed and the efficiency of separating the gas may be improved. Additionally, an outlet through which object gas flows from an absorption liquid chamber may be separated from an inlet through which rich absorbent liquid flows into the absorption liquid chamber in an absorption tower. Therefore, the level control of the absorbent liquid may be managed and the generation of bubbles within the absorbent liquid may be suppressed (e.g., reduced).

BRIEF DESCRIPTION OF THE DRAWINGS

The above and other features and advantages of the present disclosure will be more apparent from the following detailed description taken in conjunction with the accompanying drawings.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, In order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

"Rich absorbent liquid" in this specification and claims means absorbent liquid containing large amount of gas that is removing object or absorbent liquid after absorbing the gas and before regenerating the gas. "Lean absorbent liquid" in this specification and claims means absorbent liquid containing little amount of gas that is removing object or absorbent liquid from which gas is separated. "Regeneration" in this specification and claims means separation of gas from absorbent liquid. "Regeneration gas" in this specification and claims means gas separated from absorbent liquid. "Object gas" in this specification and claims means gas that is regeneration object, i.e., gas before regeneration. "Target gas" in this specification and claims means gas that will be separated from the object gas and will be captured. "Treated gas" in this specification and claims means gas remaining after the object gas is dissolved in absorbent liquid. "Evaporation gas" in this specification and claims means gas that is evaporated from condensate.

It is to be understood in this specification and claims that an "upper side", an "upper portion" or an "upper end" includes "one side", "one end portion", "one side portion" or "one end", and a "lower side", a "lower portion" or a "lower end" includes the "other side", the "other end portion", the "other side portion" or the "other end".

In addition, exemplary embodiments may be applied to chemical absorption methods for separating gas by heating absorbent liquid after the gas is absorbed in the absorbent liquid as well as chemical absorption method for trapping carbon dioxide. Therefore, it is to be understood that the scope of the present invention is not limited to a gas capture plant used in chemical absorption methods for trapping the carbon dioxide.

Figure 1:
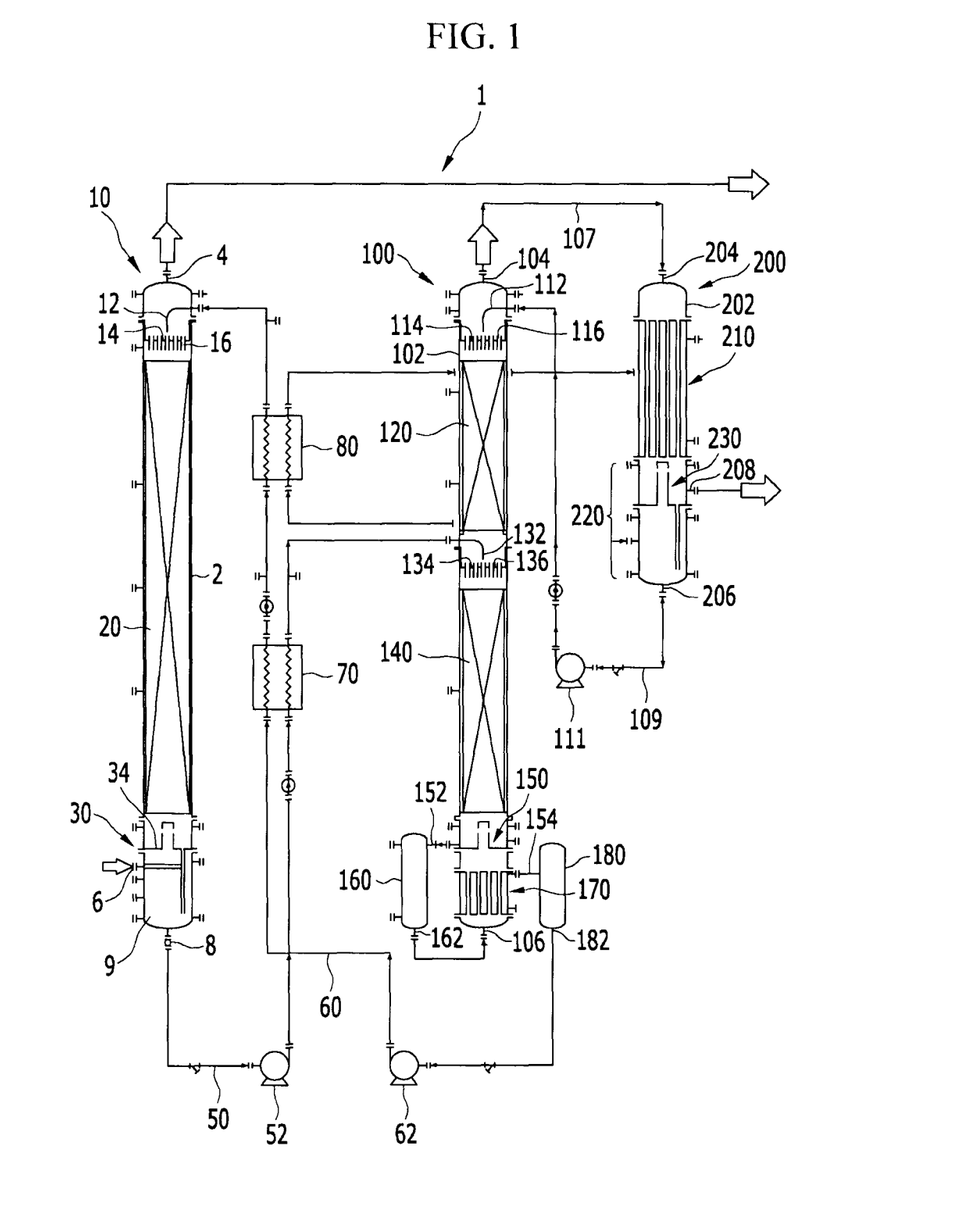
FIG. 1 is a schematic diagram of a gas capture plant according to an exemplary embodiment of the present invention.
Figure 2:
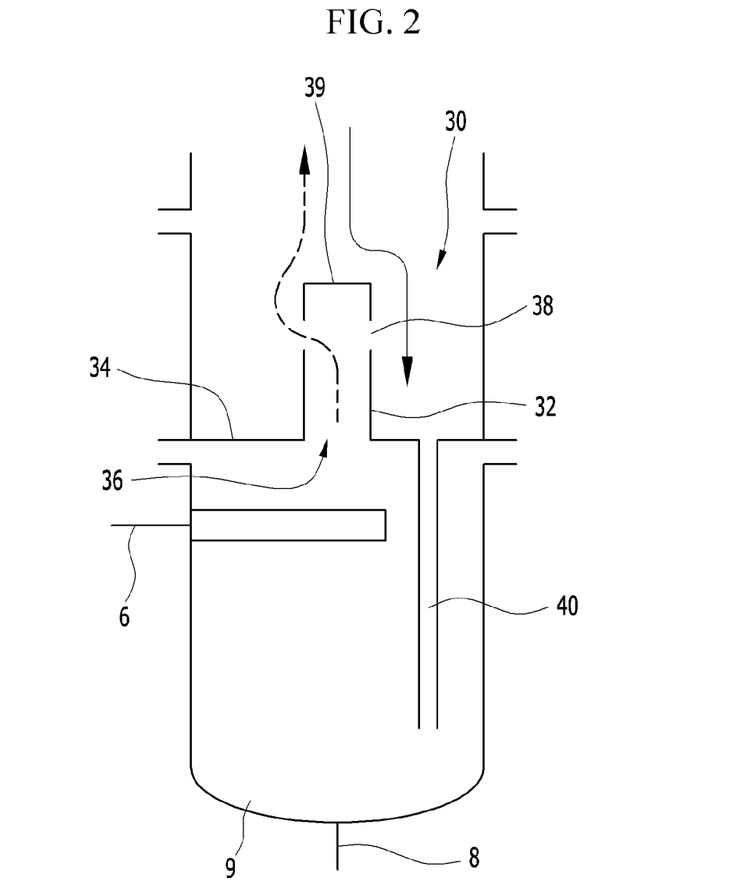
FIG. 2 is a schematic diagram of an absorption separator according to an exemplary embodiment of the present invention.
Figure 3:
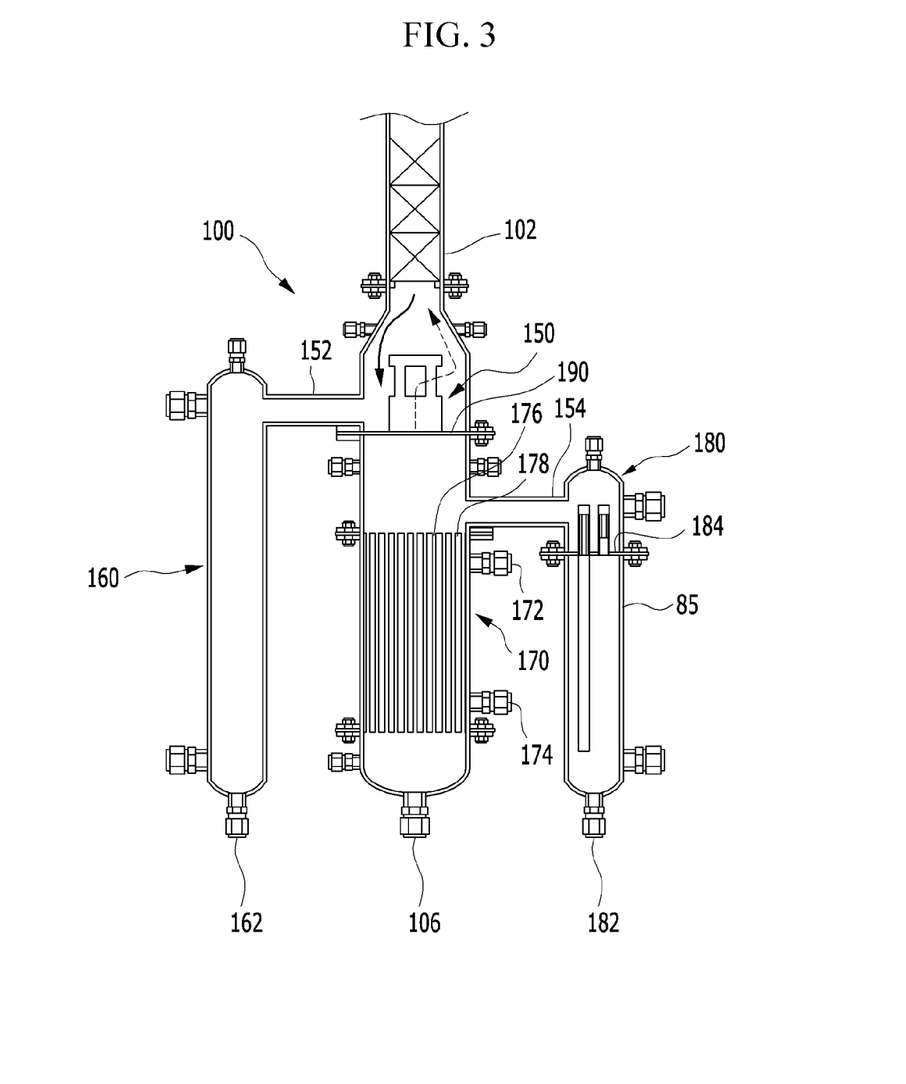
FIG. 3 is a schematic diagram of a reboiling device according to an exemplary embodiment of the present invention.
Figure 4:
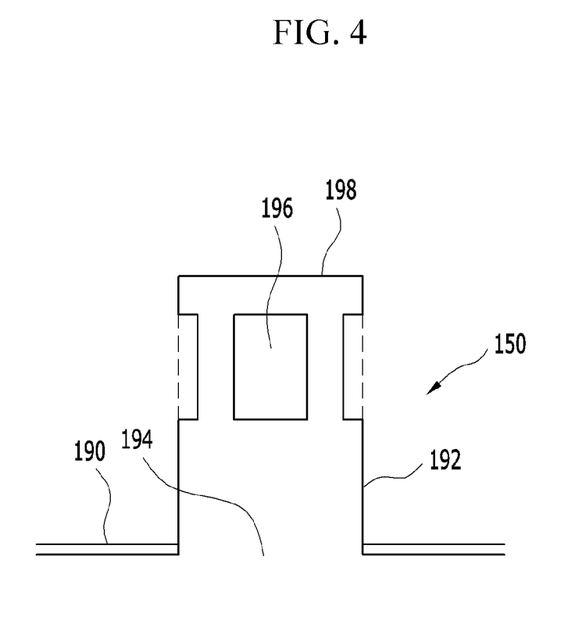
FIG. 4 is a schematic diagram of a regeneration separator according to an exemplary embodiment of the present invention.
Figure 5:
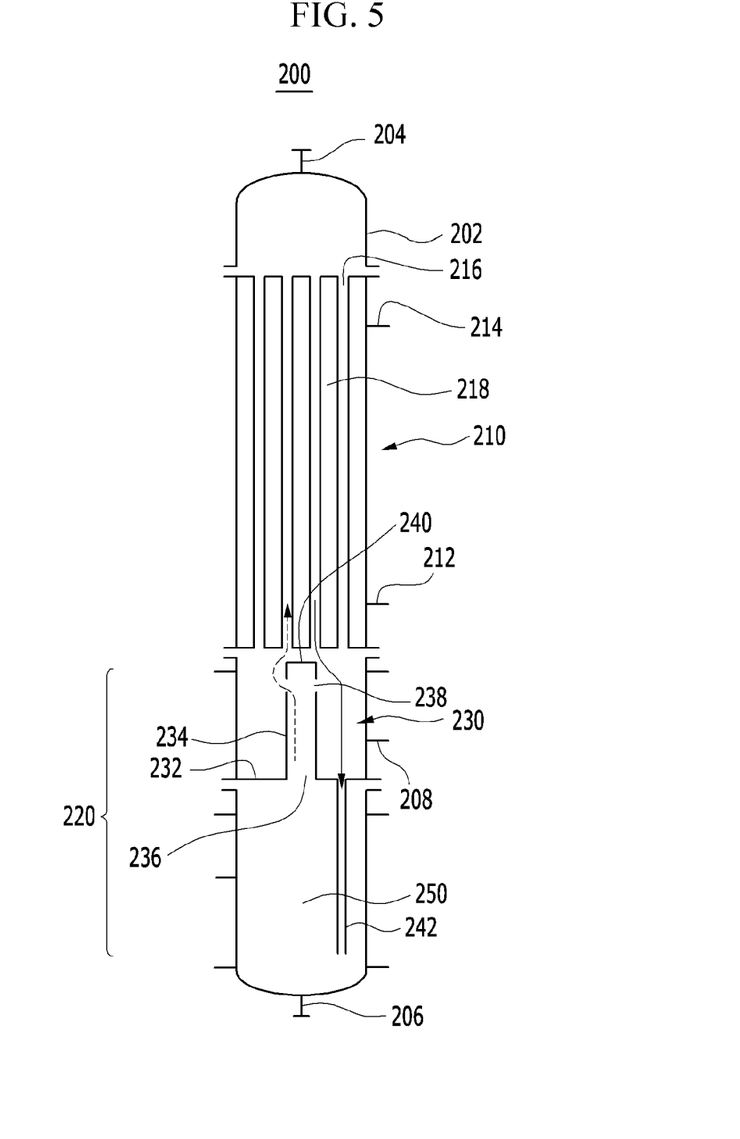
FIG. 5 is a schematic diagram of a gas condensing device according to an exemplary embodiment of the present invention.

An exemplary embodiment described herein relates to a gas capture plant that may produce rich absorbent liquid by dissolving object gas in absorbent liquid, regenerate the produced rich absorbent liquid to generate regeneration gas, and then separate target gas from the regeneration gas by condensing the regeneration gas. FIG. 1 is a schematic diagram of a gas capture plant according to an exemplary embodiment of the present invention. FIG. 2 is a schematic diagram of an absorption separator according to an exemplary embodiment of the present invention. FIG. 3 is a schematic diagram of a reboiling device according to an exemplary embodiment of the present invention. FIG. 4 is a schematic diagram of a regeneration separator according to an exemplary embodiment of the present invention. FIG. 5 is a schematic diagram of a gas condensing device according to an exemplary embodiment of the present invention.

As shown in FIG. 1, a gas capture plant 1 according to an exemplary embodiment may include an absorption tower 10, a regeneration tower 100 and a gas condensing device 200. The absorption tower 10 may be configured to dissolve object gas that requires regeneration in the lean absorbent liquid to produce rich absorbent liquid, and may include an absorption tower housing 2. A space may be formed in the absorption tower housing 2, and a lean absorbent liquid supplier 12, a plate 14, an absorption tower rectifier 20 and an absorption separator 30 may be sequentially disposed within the space from an upper portion to a lower portion. An absorbent liquid chamber 9 may be formed at a lower portion of the absorption tower housing 2, disposed, under the absorption separator 30.

The lean absorbent liquid supplier 12 may be disposed at an upper portion within the absorption tower housing 2 and may be connected to a regeneration tower 100 via a lean absorbent liquid line 60. The lean absorbent liquid supplier 12 may be configured to supply the lean absorbent liquid received from the regeneration tower 100 via the lean absorbent liquid line 60 into the absorption tower housing 2. Gravity may facilitate the flow of the lean absorbent liquid supplied into the absorption tower housing 2 to flow in a downward direction toward the lower portion of the absorption tower housing 2.

The plate 14 may be mounted within the absorption tower housing 2 disposed beneath the lean absorbent liquid supplier 12. The plate 14 may be mounted or disposed traversely across the absorption tower housing 2, and at least one penetration aperture 16 may be formed on the plate 14. The lean absorbent liquid flowing toward the lower portion of the absorption tower housing 2 may be evenly dispersed within the absorption tower housing 2 by the plate 14 and the penetration aperture 16. The absorption tower rectifier 20 may be disposed within the absorption tower housing 2 positioned beneath the plate 14.

Furthermore, the method of manufacture of the absorption tower rectifier 20 may include but is limited to twisting a thin and long wire in an irregular shape. Alternatively, a foam plastic having a porous structure may be used as the absorption tower rectifier 20. The absorption tower rectifier 20 may be configured to rectify the lean absorbent liquid thereby producing a consistent flow thereof. Additionally, the lean absorbent liquid and object gas passing through the absorption tower rectifier 20 may mix and the object gas may be dissolved into the lean absorbent liquid, thereby generating the rich absorbent liquid.

The absorption separator 30 may be disposed in the absorption tower housing 2 between the absorption tower rectifier 20 and the absorbent liquid chamber 9. The absorption separator 30 partitions an inlet through which the rich absorbent liquid flows into the absorbent liquid chamber 9 from an outlet through which the object gas flows out from the absorbent liquid chamber. As shown in FIG. 2 the absorption separator 30, may include a first mounting plate 34, a first body 32 and a first gas bypass port 38.

The first mounting plate 34 may be disposed traversely across the absorption tower housing 2 disposed below the absorption tower rectifier 20. At least one first gas flow aperture 36 and a first liquid supplying pipe 40 may be formed at the first mounting plate 34. The first body 32 may be mounted on an upper surface of the first mounting plate 34 and may extend in an upward direction. An upper surface of the first body 32 may be obstructed by a first roof 39 restricting the rich absorbent liquid from entering an interior of the first body 32 thereby accumulating on the first mounting plate 34. The accumulation of the rich absorbent liquid on the first mounting plate 34 may be supplied into the absorbent liquid chamber 9 via the first liquid supplying pipe 40. Additionally, the first liquid supplying pipe 40 may extend toward the lower end of the absorbent liquid chamber 9 and proximate to a bottom portion of the absorption tower housing 2. Therefore, the rich absorbent liquid may be supplied under a surface of the rich absorbent liquid temporarily stored in the absorbent liquid chamber 9, thereby preventing occurrence of an oscillation on the surface of the rich absorbent liquid and facilitating level control of the rich absorbent liquid.

Additionally, the first body 32 may enclose the at least one first gas flow aperture 36 to prevent the rich absorbent liquid from being directly supplied through the first body 32 to the surface of the rich absorbent liquid temporarily stored in the absorbent liquid chamber 9. The at least one first gas bypass port 38 may be formed at a side of the first body 32 and may provide for fluid communication between an interior of the first body 32 and an exterior of the first body 32. In addition, the at least one first gas bypass port 38 may be formed at a predetermined height from the first mounting plate 34 thereby preventing the rich absorbent liquid that has accumulated on the first mounting plate 34 from entering the interior of the first body 32 through the first gas bypass port 38.

Further, a treated gas outlet 4, an object gas inlet 6 and an absorption tower outlet 8 may also be formed at the absorption tower housing 2. The treated gas outlet 4 may be disposed at the upper portion of the absorption tower housing 2 and may be configured to exhaust the remaining treated gas after being dissolved into the absorbent liquid to the exterior of the absorption tower 10. The object gas inlet 6 may be disposed at the lower portion of the absorption tower housing 2, specifically at the absorbent liquid chamber 9 and may be configured to supply the object gas that requires regeneration into the absorption tower 10. Therefore, the object gas supplied into the absorbent liquid chamber 9 may be dissolved into the absorbent liquid when passing through the absorption separator 30 and the absorption tower rectifier 20. The treated gas may be exhausted to the exterior of the absorption tower 10 through the treated gas outlet 4 disposed at the upper portion of the absorption tower housing 2.

The absorption tower outlet 8 may be formed at a lower end portion of the absorption tower housing 2. Therefore, the rich absorbent liquid temporarily stored in the absorbent liquid chamber 9 may be supplied to the regeneration tower 100 through the absorption tower outlet 8. For example, the absorption tower outlet 8 may be connected to the regeneration tower 100 via a rich absorbent liquid line 50. Furthermore, first and second pumps 52 and 62 may be mounted on the rich absorbent liquid line 50 and the lean absorbent liquid line 60 to pump the rich absorbent liquid and the lean absorbent liquid, respectively. Additionally, at least one heat exchanger 70 and 80 may be mounted on the rich absorbent liquid line 50 and the lean absorbent liquid line 60 to exchange heat between the lean absorbent liquid and the rich absorbent liquid.

The lean absorbent liquid may be supplied to the upper portion of absorption tower 10 through the lean absorbent liquid supplier 12, and the object gas may be supplied to the absorbent liquid chamber 9 through the object gas inlet 6. Gravity may facilitate the flow of the lean absorbent liquid downward toward the lower portion of the absorption tower 10. The object gas may flow out from the absorbent liquid chamber 9 through the first gas flow aperture 36 and the first gas bypass port 38 of the absorption separator 30 and flow upward toward the upper portion of the absorption tower 10. The lean absorbent liquid and the object gas may be mixed together at the absorption tower rectifier 20 and the object gas may be dissolved into the lean absorbent liquid to produce the rich absorbent liquid.

The rich absorbent liquid may flow to the lower portion of the absorption tower 10 and may accumulate on the first mounting plate 34. Further, the rich absorbent liquid may be supplied to the lower portion of the absorbent liquid chamber 9 through the first liquid supplying pipe 40. Therefore, substantial oscillation may be prevented from occurring on the surface of the rich absorbent liquid stored in the absorbent liquid chamber 9, thereby facilitating the level control of the rich absorbent liquid. In other words, a path may be provided to supply the rich absorbent liquid to the absorbent liquid chamber 9 and a path may be provided to facilitate the separated object gas flow out of the absorbent liquid chamber 9. The composition of the absorbent liquid may be changed by removing the volatile component from the rich absorbent liquid due to rapid (e.g., increased) linear velocity of the object. As a result, deterioration of efficiency due to change of composition in the absorbent liquid may be prevented. Additionally, the treated gas remaining after dissolution in the absorbent liquid may flow upward in the direction of the upper portion of the absorption tower 10 and may be exhausted to the exterior of the absorption tower 10 through the treated gas outlet 4.

As shown in FIG. 1, the regeneration tower 100 according to an exemplary embodiment may include a regeneration tower housing 102. A space may be formed in the regeneration tower housing 102, and a first rich absorbent liquid supplier 112, a first regeneration tower rectifier 120, a second rich absorbent liquid supplier 132 and a second regeneration tower rectifier 140 may be sequentially disposed therein. Additionally, a regeneration gas outlet 104 may be formed at an upper end of the regeneration tower housing 102, and a rich absorbent liquid inlet 106 may be formed at a lower end of the regeneration tower housing 102.

The first rich absorbent liquid supplier 112 may be disposed at an upper portion in the regeneration tower housing 102, and may be configured to receive the rich absorbent liquid from the absorbent liquid chamber 9 through the rich absorbent liquid line 50 or alternately receive the condensate from the gas condensing device 200 or a heat exchanger (not shown) via a condensate line 109. The first rich absorbent liquid supplier 112 may be configured to supply the rich absorbent liquid received through the rich absorbent liquid line 50 and/or the condensate received through the condensate line 109 into the regeneration tower housing 102. Gravity may direct the flow of the rich absorbent liquid and/or the condensate supplied to the first rich absorbent liquid supplier 112 toward a lower portion of the regeneration tower housing 102.

A plate 114 may be mounted within the regeneration tower housing 102 beneath the first rich absorbent liquid supplier 112. The plate 114 may be disposed traversely across the regeneration tower housing 102, having at least one penetration aperture 116 formed thereon. The rich absorbent liquid and/or the condensate flowing toward the lower portion of the regeneration tower housing 102 may be evenly dispersed within the regeneration tower housing 102 by the plate 114 and the penetration aperture 116.

The first regeneration tower rectifier 120 may be disposed within the regeneration tower housing 102 beneath the plate 114. Various methods of manufacture may be used to construct the first regeneration tower rectifier 120, for example the first regeneration tower rectifier 120 may be manufactured by twisting a thin and long wire in an irregular shape. In an alternate exemplary embodiment, a porous foam plastic may be used as the first regeneration tower rectifier 120. The first regeneration tower rectifier 120 may be configured to rectify the rich absorbent liquid and/or the condensate to smoothen flow thereof.

The second rich absorbent liquid supplier 132 may be disposed in the regeneration tower housing 102 under the first regeneration tower rectifier 120, and may be configured to receive the rich absorbent liquid from the absorbent liquid chamber 9 via the rich absorbent liquid line 50. The second rich absorbent liquid supplier 132 may be configured to supply the rich absorbent liquid received via the rich absorbent liquid line 50 into the regeneration tower housing 102.

Gravity may cause the rich absorbent liquid supplied from the second rich absorbent liquid supplier 132 to flow towards the lower portion of the regeneration tower housing 102. The rich absorbent liquid supplied to the second rich absorbent liquid supplier 132 may be the same as or different from that supplied to the first rich absorbent liquid supplier 112.

Further, the plate 134 may be mounted in the regeneration tower housing 102 beneath the second rich absorbent liquid supplier 132. The plate 134 may be positioned traversely across the regeneration tower housing 102, and at least one penetration aperture 136 may be formed on the plate 134. The plate 134 and the penetration aperture 136 may evenly disperse the rich absorbent liquid and/or the condensate flowing toward the lower portion of the regeneration tower housing 102 within the regeneration tower housing.

The second regeneration tower 140 rectifier may be disposed within the regeneration tower housing 102 beneath the plate 134. The second regeneration tower rectifier 140 may be manufactured by various methods including twisting a thin and long wire in an irregular shape. Alternatively, a porous foam plastic may be used as the second regeneration tower rectifier 140. The second regeneration tower rectifier 140 may be configured to rectify the rich absorbent liquid and/or the condensate supplied from the first rich absorbent liquid supplier 112 to provide a substantially consistent flow thereof, and rectify the rich absorbent liquid supplied from the second rich absorbent liquid supplier 132 to further provide a substantially consistent flow thereof.

The regeneration tower 100 may also include a reboiling device. The reboiling device, as shown in FIG. 1, may be disposed below the second regeneration tower rectifier 140 and may include a rich absorbent liquid tank 160, a reboiler 170, a regeneration separator 150 and a lean absorbent liquid tank 180. The reboiling device may be configured to regenerate gas contained within the rich absorbent liquid supplied from the second regeneration tower rectifier 140. As shown in FIG. 3, the rich absorbent liquid tank 160, may be in fluid communication with the regeneration tower housing 102 via a rich absorbent liquid connection line 152 to supply the rich absorbent liquid and/or the condensate passing through the second regeneration tower rectifier 140 to the rich absorbent liquid tank 160 via the rich absorbent liquid connection line 152. A rich absorbent liquid outlet 162 may be formed at the lower portion of the rich absorbent liquid tank 160.

The reboiler 170 may be mounted within the regeneration tower housing 102 below the second regeneration tower rectifier 140, and may be positioned above a bottom portion of the regeneration tower housing 102 by a predetermined distance. The reboiler 170 may be configured to boil the rich absorbent liquid to separate regeneration gas from the rich absorbent liquid. The reboiler 170 may include a rich absorbent liquid inlet 106, a first operating fluid inlet 172, a first circulation line 176, a second circulation line 178 and a first operating fluid outlet 174.

The rich absorbent liquid inlet 106 may be formed at a lower portion of the regeneration tower housing 102 and in fluid communication with the rich absorbent liquid outlet 162 to receive the rich absorbent liquid from the rich absorbent liquid tank 160. For example, the rich absorbent liquid tank 160 may be configured to supply the rich absorbent liquid to the regeneration tower housing 102. As the rich absorbent liquid is supplied to the regeneration tower housing 102, a level of the rich absorbent liquid in the regeneration tower housing 102 may increase and the rich absorbent liquid may be supplied to the reboiler 170. The first operating fluid inlet 172 may be formed at a position proximate to the reboiler 170 of the regeneration tower housing 102 and may be configured to supply operating fluid to the reboiler 170. The operating fluid may be in the form of water vapor generated within the power plants or the boiler equipment but may not be limited to this.

The first circulation line 176 may be formed in the reboiler 170 and the operating fluid through the first operating fluid inlet 172 may flow in the first circulation line 176. The first circulation line 176 may not be in fluid communication with the interior of the regeneration tower housing 102. However, the second circulation line 178 may be formed in the reboiler 170 and may be formed proximate to the first circulation line 176. In particular, a portion of the reboiler 170 other than the first circulation line 176 may become the second circulation line 178. The second circulation line 178 may be in fluid communication with the interior of the regeneration tower housing 102.

In other words, the rich absorbent liquid may exist in the second circulation line 178 when the level of the rich absorbent liquid supplied to the regeneration tower housing 102 increases. Furthermore, the rich absorbent liquid disposed within the second circulation line 178 may exchange heat with the operating fluid disposed within and flowing through the first circulation line 176. Therefore, the regeneration gas may be separated from the rich absorbent liquid, and thereby, the lean absorbent liquid may be positioned at an upper portion of the reboiler 170. Additionally, the regeneration gas separated from the rich absorbent liquid may flow upward within the regeneration tower housing 102.

The first operating fluid outlet 174 may be formed at a position that corresponds to the reboiler 170 of the regeneration tower housing 102 and the operating fluid circulating through the first circulation line 176 may be exhausted to the exterior of the regeneration tower housing 102 through the first operating fluid outlet 174. Herein, it is exemplified but is not limited that the reboiler 170 may be a heat exchanger configured to heat the rich absorbent liquid by heat-exchange with the operating fluid. Alternatively, the reboiler 170 may be an electric wire configured to receive current and generate heat.

The regeneration separator 150 may be mounted within the regeneration tower housing 102 positioned between the second regeneration tower rectifier and the reboiler 170, and may separate a supply path of the rich absorbent liquid into the reboiler 170 from an exhaust path of the regeneration gas generated in the reboiler 170. For example, the regeneration separator 150, as shown in FIG. 4, may include a second mounting plate 190, a second body 192 and a second gas bypass port 196. The second mounting plate 190 may be disposed traversely across the regeneration tower housing 102 disposed below both a connecting portion of the rich absorbent liquid connection line 152 and the regeneration tower housing 102. At least one second gas flow aperture 194 may be formed at the second mounting plate 190.

The second body 192 may be mounted on an upper surface of the second mounting plate 190 and may extend upwardly. An upper surface of the second body 192 may be obstructed by a second roof 198 precluding the dropped rich absorbent liquid and/or condensate from entering an interior of the second body 192 thereby causing the rich absorbent liquid and/or condensate to accumulate on the second mounting plate 190. For example, the rich absorbent liquid that has accumulated on the second mounting plate 190 may flow to the rich absorbent liquid tank 160 via the rich absorbent liquid connection line 152. Additionally, the second body 192 may enclose the at least one second gas flow aperture 194 to prevent the rich absorbent liquid that has accumulated on the second mounting plate 190 from being directly supplied to the reboiler 170.

The at least one second gas bypass port 196 may be formed on a side surface of the second body 192 and an interior of the second body 192 may be in fluid communication with an exterior of the second body 192. The at least one second gas bypass port 196 may be formed at a predetermined height from the second mounting plate 190 thereby preventing the rich absorbent liquid that has accumulated on the second mounting plate 190 from entering the interior of the second body 192 through the second gas bypass port 196. In other words, the vertical position of the rich absorbent liquid connection line 152 may be lower than that of the at least one second gas bypass port 196.

As further shown in FIG. 3, the lean absorbent liquid tank 180 may be in fluid communication with the regeneration tower housing 102 via a lean absorbent liquid connection line 154. For example, the lean absorbent liquid and the regeneration gas separated within the reboiler 170 may flow into the lean absorbent liquid tank 180 through the lean absorbent liquid connection line 154. A connecting portion of the lean absorbent liquid connection line 154 and the regeneration tower housing 102 may be positioned between the second mounting plate 190 and the reboiler 170. Therefore, the rich absorbent liquid undergoing the regeneration in the reboiler 170 may not be supplied to the regeneration separator 150, but may be alternately supplied to the lean absorbent liquid tank 180.

A lean absorbent liquid outlet 182 may be formed at a lower end of the lean absorbent liquid tank 180 and may be connected to the lean absorbent liquid supplier 12 via the lean absorbent liquid line 60. Further, the lean absorbent liquid in the lean absorbent liquid tank 180 may be supplied back to the lean absorbent liquid supplier 12 through the lean absorbent liquid line 60. Additionally, a supporting plate 184 may be mounted within the lean absorbent liquid tank 180 and a level sensor and a pressure sensor may be mounted on the supporting plate 184. The level sensor may be configured to detect a level of the lean absorbent liquid in the lean absorbent liquid tank 180 and the pressure sensor may be configured to detect the pressure of the lean absorbent liquid tank 180. Additionally, the lean absorbent liquid outlet 182 may be in a closed position or an open position based on the results detected by the level sensor and the pressure sensor.

When the rich absorbent liquid is supplied from the absorption tower 10 into the regeneration tower housing 102 through the first rich absorbent liquid supplier 112 or the second rich absorbent liquid supplier 32, gravity may cause the rich absorbent liquid to flow in a downward direction. At this time, the flow of the rich absorbent liquid may be rectified by the first regeneration tower rectifier 120 or the second regeneration tower rectifier.

The rich absorbent liquid, as represented by a solid line arrow in FIG. 3, may be obstructed from flowing into the interior of the second body 192 by the second roof 198 but may flow onto the second mounting plate 190. For example, the rich absorbent liquid may accumulate on the second mounting plate 190. When the level of the rich absorbent liquid that has accumulated on the second mounting plate 190 increases and becomes greater than a height of a lower end of the rich absorbent liquid connection line 152, the rich absorbent liquid may be supplied into the rich absorbent liquid tank 160 via the rich absorbent liquid connection line 152 and may then be supplied into the regeneration tower housing 102 through the rich absorbent liquid outlet 162 and the rich absorbent liquid inlet 106.

When the level of the rich absorbent liquid in the regeneration tower housing 102 increases the rich absorbent liquid may be supplied into the reboiler 170, the rich absorbent liquid may be heated and the regeneration gas may be separated from the rich absorbent liquid through heat-exchange between the rich absorbent liquid and the operating fluid. The regeneration gas may be separated from the rich absorbent liquid, as represented by a dotted line arrow in FIG. 3, and may move to the exterior of the second body 192 through the second gas flow aperture 194 and the second gas bypass port 196. The regeneration gas may flow upward and may be exhausted to the exterior of the regeneration tower housing 102 through the regeneration gas outlet 104.

Furthermore, as the rich absorbent liquid is continuously supplied to the reboiler 170, the level of the lean absorbent liquid from which the regeneration gas is separated may increase. When the level of the lean absorbent liquid increases and exceeds the height of the lower end of the lean absorbent liquid connection line 154, the lean absorbent liquid may be supplied to the lean absorbent liquid tank 180 via the lean absorbent liquid connection line 154. Additionally, the lean absorbent liquid supplied to the lean absorbent liquid tank 180 may be supplied back to the absorption tower 10 through the lean absorbent liquid outlet 182.

As shown in FIG. 1, the gas condensing device 200 according to an exemplary embodiment may include a housing 202. In particular, a space may be formed in the housing 202, a condenser 210 may be mounted in an upper portion of the space, and a reflux apparatus 220 may be mounted in a lower portion of the space. The condenser 210 may be mounted in the upper portion of the housing 202 and may be configured to condense the regeneration gas and separate target gas from the condensate. The condenser 210 may include a second operating fluid inlet 212, a third circulation line 216, a fourth circulation line 218 and a second operating fluid outlet 214.

The second operating fluid inlet 212 may be formed at a position that corresponds to the condenser 210 of the housing 202 and may be configured to supply the operating fluid to the condenser 210. The operating fluid may include coolant however alternate operating fluids may also be included. The third circulation line 216 may be formed in the condenser 210 and the operating fluid through the second operating fluid inlet 212 may flow in the third circulation line 216. The third circulation line 216 may not be in fluid communication with the interior of the housing 202. The fourth circulation line 218 may be formed in the condenser 210 and may be formed proximate to the third circulation line 216. For example, a portion of the condenser 210 other than the third circulation line 216 may become the fourth circulation line 218. The fourth circulation line 218 may be in fluid communication with the interior of the housing 202 supplying regeneration gas to the housing 102 and may pass through the fourth circulation line 218.

Moreover, the regeneration gas in the fourth circulation line 218 may be condensed through the heat-exchange with the operating fluid passing through the third circulation line 216. Therefore, the target gas may be separated from the condensate and the condensate may thereby be supplied to the reflux apparatus 220. The second operating fluid outlet 214 may be formed at a position that corresponds to the condenser 210 of the housing 102 and the operating fluid may pass through the third circulation line 216 and may thereby be exhausted to the exterior of the housing 102 through the second operating fluid outlet 214.

The reflux apparatus 220, as shown in FIG. 5, may include a condensate chamber 250 and a reflux separator 230. The condensate chamber 250 may be formed at the lower portion of the housing 202 and may be configured to temporarily store the condensate. The reflux separator 230 may be disposed between the condenser 210 and the condensate chamber 250 within the housing 202. The reflux separator 230 may be configured to separate an inlet through which the condensate supplies into the condensate chamber 250 from an outlet that may exhaust the evaporation gas from the condensate chamber 250. Furthermore, the reflux separator 230, as shown in FIG. 5, may include a third mounting plate 232, a third body 234 and a third gas bypass port 238.

The third mounting plate 232 may be disposed traversely across the housing 202 positioned beneath the condenser 210. At least one third gas flow aperture 236 and a second liquid supplying pipe 242 may be formed at the third mounting plate 232. The third body 234 may be mounted on an upper surface of the third mounting plate 232 and may extend in an upward longitudinal direction. An upper surface of the third body 234 may be obstructed by a third roof 240 preventing the condensate from entering an interior of the third body 234 thereby accumulating on the third mounting plate 232. The accumulated condensate on the third mounting plate 232 may be supplied into the condensate chamber 250 through the second liquid supplying pipe 242. Further, the second liquid supplying pipe 242 may extend toward the lower end of the condensate chamber 250 and proximate to a bottom portion of the condensate chamber 250. Therefore, the condensate may be supplied beneath a surface of the condensate temporarily stored in the condensate chamber 250, thereby preventing an oscillation on the surface of the condensate temporarily stored in the condensate chamber 250 and facilitating controlling the level of the condensate.

Additionally, the third body 234 may enclose the at least one third gas flow aperture 236 to prevent the condensate from being directly supplied through the third body 234 to the surface of the condensate temporarily stored in the condensate chamber 250. The at least one third gas bypass port 238 may be formed at a side of the third body 234 and an interior of the third body 234 may be in fluid communication with an exterior of the third body 234. The at least one third gas bypass port 238 may be formed at a predetermined height from the third mounting plate 232 to prevent the condensate that has accumulated on the third mounting plate 232 from entering the third body 234 through the third gas bypass port 238.

A regeneration gas inlet 204, a condensate outlet 206 and a target gas outlet 208 may be formed at the housing 202. The regeneration gas inlet 204 may be formed at an upper end portion of the housing 202 and may be in fluid communication with the regeneration gas outlet 104 of the regeneration tower housing 102. In particular, the regeneration gas generated in the regeneration tower 100 may be supplied into the upper end portion of the housing 202 through the regeneration gas outlet 104 and the regeneration gas inlet 204. The condensate outlet 206 may be formed at a lower end portion of the housing 202 and may be connected to the first rich absorbent liquid supplier 112 via the condensate line 109. For example, the condensate temporarily stored in the condensate chamber 250 may be supplied back to the regeneration tower 100 through the condensate outlet 206 and the condensate line 109. A third pump 111 may be mounted on the condensate line 109 to pump the condensate disposed in the condensate chamber 250.

Furthermore, the target gas outlet 208 may be formed between the condenser 210 and the reflux separator 230 at the housing 202. The target gas separated from the condensate in the condenser 210 may be exhausted from the gas condensing device 200 through the target gas outlet 208 and may be further captured in an additional tank. The regeneration gas may be supplied to the upper portion of the gas condensing device 200 through the regeneration gas inlet 204. The regeneration gas supplied to the gas condensing device 200 may flow in a downward longitudinal direction toward the lower portion of the gas condensing device 200 and may pass through the condenser 210. Still further, the regeneration gas may be condensed in the condenser 210 and may be separated into the condensate and the target gas.

The target gas may be exhausted to the exterior of the gas condensing device 200 through the target gas outlet 208, while the condensate has accumulated on the third mounting plate 232. The condensate may be supplied to the lower portion of the condensate chamber 250 through the second liquid supplying pipe 242. Therefore, a significant oscillation may be prevented from occurring on the surface of the condensate stored in the condensate chamber 250, and level control of the condensate may be facilitated.

Additionally, the evaporation gas may be evaporated from the condensate temporarily stored in the condensate chamber 250. The evaporation gas may be exhausted from the condensate chamber 250 through the third gas flow aperture 236 of the reflux separator 230 and the third gas bypass port 238, and may then be condensed in the condenser 210. The flow interference between the condensate and the evaporation gas may be prevented since the path through which the condensate is supplied to the condensate chamber 250 may be separated from the path through which the evaporation gas is exhausted from the condensate chamber 250, thereby facilitating re-condensing of the evaporation gas. Additionally, the condensate temporarily stored in the condensate chamber 250 may be supplied back to the regeneration tower 100 through the condensate line 109.

While this invention has been described in connection with what is presently considered to be exemplary embodiments, it is to be understood that the present disclosure is not limited to the disclosed exemplary embodiments, but on the contrary, is intended to cover various modifications and equivalent arrangements included within the spirit and scope of the appended claims. In addition, it is to be considered that all of these modifications and alterations fall within the scope of the present disclosure.

What is claimed is:

1. A gas capture plant, comprising:
    an absorption tower configured to dissolve object gas in lean absorbent liquid to produce rich absorbent liquid;
    a regeneration tower configured to heat the rich absorbent liquid to produce the lean absorbent liquid from which regeneration gas is separated and supply the produced lean absorbent liquid back to the absorption tower; and
    a gas condensing device configured to condense the regeneration gas received from the regeneration tower to separate condensate and target gas, supply the separated condensate to the regeneration tower, and exhaust the separated target gas,
    wherein the gas condensing device includes a condenser and a reflux apparatus disposed in one housing, and the condenser is disposed above the reflux apparatus, and
    wherein the reflux apparatus includes:
        a condensate chamber formed at a lower portion of the one housing and is configured to temporarily store the condensate; and
        a reflux separator disposed in the one housing between the condenser and the condensate chamber, configured to supply the condensate passing through the condenser into the condensate chamber, and exhaust evaporation gas evaporated from the condensate to the exterior of the condensate chamber, wherein the reflux separator is configured to separate an outlet through which the evaporation gas is exhausted from the condensate chamber from an inlet through which the condensate passing through the condenser flows into the condensate chamber, wherein the reflux separator includes:
a third mounting plate extending traversely across the one housing disposed between the condenser and the condensate chamber and provided with at least one third gas flow aperture formed thereon;
a third body of hollow pillar shape mounted on an upper surface of the third mounting plate and having an upper surface obstructed by a third roof;
at least one third gas bypass port formed at a side surface of the third body and fluidly communicating an interior of the third body with an exterior of the third body; and
a second liquid supplying pipe extending downward from the third mounting plate and configured to supply the condensate into the condensate chamber,
wherein the at least one third gas flow aperture fluidly communicates an interior of the one housing disposed under the third mounting plate with the interior of the third body.

2. The gas capture plant of claim 1, wherein the absorption tower includes:
an absorption tower housing;
a lean absorbent liquid supplier disposed at an upper portion within the absorption tower housing and configured to supply the lean absorbent liquid into the absorption tower housing;
an absorption tower rectifier positioned below the lean absorbent liquid supplier in the absorption tower housing and configured to rectify flow of the lean absorbent liquid supplied into a lower portion of the absorption tower housing;
an absorption liquid chamber disposed under the absorption tower rectifier in the absorption tower housing and configured to temporarily store the rich absorbent liquid in which object gas is dissolved; and
an absorption separator disposed between the absorption tower rectifier and the absorption liquid chamber within the absorption tower housing, wherein the object gas is supplied into the absorption liquid chamber.

3. The gas capture plant of claim 2, wherein the absorption separator partitions an outlet through which the object gas flows out from the absorption liquid chamber from an inlet through which the rich absorbent liquid enters the absorption liquid chamber.

4. The gas capture plant of claim 3, wherein the absorption separator includes:
a first mounting plate extending traversely across the absorption tower housing disposed between the absorption tower rectifier and the absorption liquid chamber and provided with at least one first gas flow aperture formed thereon;
a first body of hollow pillar shape mounted on an upper surface of the first mounting plate and having an upper surface obstructed by a first roof;
at least one first gas bypass port formed at a side surface of the first body and fluidly communicating an interior of the first body with an exterior of the first body; and
a first liquid supplying pipe extending downward from the first mounting plate and configured to supply an absorbent liquid into the absorption liquid chamber,
wherein the at least one first gas flow aperture fluidly communicates an interior of the absorption tower housing disposed under the first mounting plate with the interior of the first body.

5. The gas capture plant of claim 2, wherein a treated gas outlet for discharging treated gas from which target gas is removed to an exterior of the absorption tower housing is formed at an upper end portion of the absorption tower housing, and an absorption tower outlet for supplying the rich absorbent liquid to a regeneration tower is formed at a lower end portion of the absorption tower housing.

6. The gas capture plant of claim 4, wherein the regeneration tower includes:
a regeneration tower housing;
a rich absorbent liquid supplier disposed above the regeneration tower housing and configured to supply the rich absorbent liquid into the regeneration tower housing;
a regeneration tower rectifier disposed below the rich absorbent liquid supplier in the regeneration tower housing and configured to rectify the rich absorbent liquid supplying downward within the regeneration tower housing;
a reboiler disposed in the regeneration tower housing below the regeneration tower rectifier and configured to boil the rich absorbent liquid to separate the regeneration gas from the rich absorbent liquid;
a rich absorbent liquid tank configured to temporarily store the rich absorbent liquid; a regeneration separator configured to supply the rich absorbent liquid supplied from the regeneration tower rectifier into the rich absorbent liquid tank, exhaust the regeneration gas generated in the reboiler to the exterior of the reboiler, and is disposed in the regeneration tower housing between the reboiler and the regeneration tower rectifier; and
a lean absorbent liquid tank receiving the lean absorbent liquid separated from which the regeneration gas at the reboiler and configured to temporarily store the lean absorbent liquid.

7. The gas capture plant of claim 6, wherein the reboiler is configured to receive the rich absorbent liquid via the rich absorbent liquid tank.

8. The gas capture plant of claim 7, wherein a rich absorbent liquid outlet is formed at a lower portion of the rich absorbent liquid tank, and a rich absorbent liquid inlet which is in fluid communication with the rich absorbent liquid outlet is formed at a lower portion of the regeneration tower housing and the rich absorbent liquid in the rich absorbent liquid tank is supplied to the reboiler through the rich absorbent liquid outlet and the rich absorbent liquid inlet.

9. The gas capture plant of claim 7, wherein the regeneration tower housing is in fluid communication with the rich absorbent liquid tank via a rich absorbent liquid connection line and is in fluid communication with the lean absorbent liquid tank via a lean absorbent liquid connection line, and a connection portion of the rich absorbent liquid connection line and the regeneration tower housing is positioned higher than the lean absorbent liquid connection line and the regeneration tower housing.

10. The gas capture plant of claim 9, wherein the regeneration separator is configured to supply the rich absorbent liquid passing through the regeneration tower rectifier into the reboiler through the rich absorbent liquid tank and exhaust the regeneration gas generated in the reboiler to the exterior of the reboiler.

11. The gas capture plant of claim 10, wherein the regeneration separator includes:
- a second mounting plate extending traversely across the regeneration tower housing disposed below the connection portion of the rich absorbent liquid connection line and the regeneration tower housing, and provided with at least one second gas flow aperture formed thereon;
- a second body of hollow pillar shape mounted on an upper surface of the second mounting plate and having an upper surface obstructed by a second roof; and
- at least one second gas bypass port formed at a side surface of the second body and an interior of the second body in fluid communication with an exterior of the second body,
- wherein the at least one second gas flow aperture is in fluid communication with an interior of the regeneration tower housing disposed under the second mounting plate within the interior of the second body.

12. The gas capture plant of claim 11, wherein the regeneration gas generated in the reboiler is supplied to the interior of the regeneration tower housing above the second mounting plate through the at least one second gas flow aperture and the at least one second gas bypass port.

13. The gas capture plant of claim 11, wherein a connection portion of the lean absorbent liquid connection line and the regeneration tower housing is disposed between the reboiler and the second mounting plate.

14. The gas capture plant of claim 6, wherein the reboiler includes:
- a first circulation line through which operating fluid flows; and
- a second circulation line through which the lean absorbent liquid, the rich absorbent liquid and/or the regeneration gas flow,
- wherein the first circulation line and the second circulation line are formed proximate to each other, and the operating fluid flowing through the first circulation line is heat-exchanged with the lean absorbent liquid, the rich absorbent liquid and/or the regeneration gas flowing through the second circulation line.

15. The gas capture plant of claim 6, wherein the reboiler includes an electric wire configured to receive current and generate heat.

16. The gas capture plant of claim 6, wherein a lean absorbent liquid outlet for supplying the lean absorbent liquid back into the absorption tower is formed at a lower portion of the lean absorbent liquid tank, and a regeneration gas outlet for supplying the regeneration gas into the gas condensing device is formed at an upper portion of the regeneration tower housing.

17. The gas capture plant of claim 1, wherein a target gas outlet for exhausting the target gas separated from the regeneration gas to the exterior of the gas condensing device is formed at the one housing above the third mounting plate.

18. The gas capture plant of claim 1, wherein a condensate outlet for supplying the condensate back into the regeneration tower is formed at a lower portion of the one housing, and a regeneration gas inlet for receiving the regeneration gas from the regeneration tower is formed at an upper portion of the one housing.

* * * * *